(12) United States Patent
Baaijens

(10) Patent No.: US 8,456,100 B2
(45) Date of Patent: Jun. 4, 2013

(54) DEVICE FOR GENERATING LIGHT

(75) Inventor: Johannes Petrus Wilhelmus Baaijens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1194 days.

(21) Appl. No.: 12/305,408

(22) PCT Filed: Jun. 22, 2007

(86) PCT No.: PCT/IB2007/052425
§ 371 (c)(1),
(2), (4) Date: Dec. 18, 2008

(87) PCT Pub. No.: WO2008/001289
PCT Pub. Date: Jan. 3, 2008

(65) Prior Publication Data
US 2009/0278476 A1    Nov. 12, 2009

(30) Foreign Application Priority Data

Jun. 26, 2006    (EP) ..................... 06116096

(51) Int. Cl.
*H05B 37/02*    (2006.01)

(52) U.S. Cl.
USPC ................ 315/291; 315/308; 315/312

(58) Field of Classification Search
USPC ............ 315/291, 294, 297, 307, 308, 312, 315/316, 324, 360; 345/76, 82, 83, 590–599
See application file for complete search history.

(56) References Cited

U.S. PATENT DOCUMENTS

| 5,384,519 | A  | * | 1/1995 | Gotoh .......................... 315/324 |
| 6,259,428 | B1 |   | 7/2001 | Ramchandani et al. |
| 6,639,574 | B2 | * | 10/2003 | Scheibe ........................ 345/83 |
| 6,936,978 | B2 |   | 8/2005 | Morgan et al. |
| 7,049,769 | B2 | * | 5/2006 | Boulouednine et al. ...... 315/324 |
| 2002/0145394 | A1 | * | 10/2002 | Morgan et al. ................ 315/291 |

(Continued)

FOREIGN PATENT DOCUMENTS

| JP | 07006878 | 1/1995 |
| WO | 2004100613 A1 | 11/2004 |

OTHER PUBLICATIONS

Gaurav Sharm et al; "Digital Color Imaging", IEEE Transactions on Image Processing, Piscataway, NJ, US, vol. 6, No. 7, Jul. 1997, XP011026182.

*Primary Examiner* — Tung X Le
(74) *Attorney, Agent, or Firm* — John F. Salazar; Mark L. Beloborodov

(57) ABSTRACT

An illumination system (10; 100) for generating light comprises: at least one a lamp assembly (14; 114) capable of generating light (17; 117) with a variable color; a controller (15; 115) for controlling the lamp assembly; a user input device (19) coupled to the controller. The controller (15; 115) is designed, on the basis of data received from the user input device (19), to generate color control signals for the lamp assembly. The controller (15) is designed, on the basis of data received from the user input device (19), to calculate a path (47) in a color space (31), to calculate the coordinates of a set of color points (E; CP(2), CP(3)) along the calculated path (47), and to generate its color control signals in accordance with the calculated color points. The illumination system may be for generating dynamic light sequences, or for generating a spatial color distribution.

3 Claims, 6 Drawing Sheets

U.S. PATENT DOCUMENTS

| | | | |
|---|---|---|---|
| 2004/0178751 A1* | 9/2004 | Mueller et al. | 315/294 |
| 2005/0122718 A1 | 6/2005 | Kazar et al. | |
| 2005/0146734 A1 | 7/2005 | Stokes et al. | |
| 2006/0158881 A1* | 7/2006 | Dowling | 362/231 |

* cited by examiner

DEVICE FOR GENERATING LIGHT

This application is a national stage application under 35 U.S.C. §371 of International Application No. PCT/IB2007/052425 filed on Jun. 22, 2007, and published in the English language on Jan. 3, 2008, as International Publication No. WO/2008/001289, which claims priority to European Application No. 06116096.6 filed on Jun. 26, 2006, incorporated herein by reference.

FIELD OF THE INVENTION

The present invention relates in general to the field of lighting. More particularly, the present invention relates to a device for generating light, capable of generating dynamic color sequences and/or a spatial color distribution.

BACKGROUND OF THE INVENTION

Illumination systems for illuminating a space with a variable color are generally known. Generally, such systems comprise a plurality of light sources, each light source emitting light with a specific color, the respective colors of the different light sources being mutually different. The overall light generated by the system as a whole is then a mixture of the light emitted by the several light sources. By changing the relative intensities of the different light sources, the color of the overall light mixture can be changed. It is noted that the light sources can be of different type, such as for instance TL lamp, halogen lamp, LED, etc. In the following, simply the word "lamp" will be used, but this is not intended to exclude LEDs.

By way of an example of a variable color illumination system, an illumination system in a theatre is mentioned. During a show, it may be desirable to change the color of the lighting. However, also in the case of homes, shops, restaurants, hotels, schools, hospitals, etc., it may be desirable to be able to change the color of the lighting. In the case of a theatre or the like, the colors are typically changed with a view to enhance dramatic effects, but in other situations it may be more desirable to have smooth and slow transitions.

The color of the lighting can be changed instantaneously by a lighting operator, who directly controls the individual lamps. In such case, the lighting operator may decide intuitively to change the lighting in response to changes in the scene, the ambient lighting, the reaction of the public, etc. The present invention, however, relates to a system with a programmable control device that controls the individual lamps in accordance with a predetermined program. A lighting designer conceives, in advance, a sequence of colors, and this sequence is programmed into a memory of the control device, either in the form of a program or, more likely, in the form of a table. Such table contains, for each moment in time, the required color point of the system or even the relative intensities of the different light sources. After inputting the separate color values, the designer can switch on the lamps with these color values to see whether the resulting color effect is to his liking. After having inputted a sequence of color values, the designer can run the lighting program to see whether the resulting color sequence is to his liking. In view of the fact that the designer has to program each color at each time step, programming dynamic color sequences is currently a difficult, time-consuming and tedious effort.

The present invention aims to provide a method and device with which the process of creating dynamic color sequences is made much more convenient and user-friendly.

As should be clear to a person skilled in the art, the color of light can be represented by coordinates of a color point in a color space. In such representation, changing a color corresponds to a displacement from one color point to another color point in the color space, or a displacement of the setting of the color point of the system. Further, a sequence of colors corresponds to a collection of color points in the color space, which collection will be indicated as a path. Dynamically changing the colors can then be indicated as "traveling" such path.

The examples mentioned above relate to situations where it is desired to illuminate a certain location with light having a certain color, and where it is desired to vary that color as a function of time. In such situation, at each moment in time there is basically one color point, and this color point is varied as a function of time. On the other hand, there are also situations where it is desired to illuminate a certain area with light having different colors, such that the color of the light in different locations of the area may be mutually different. In such situation, there is a distribution of color points over the area; in other words, the color points are varied as a function of location. The color distribution itself may be varied as a function of time, but in the present explanation it will be assumed that the color distribution is stationary, i.e. does not depend on time.

In such situations, an illumination system comprises an array of armatures, each armature comprising a plurality of light sources as mentioned above. Thus, each armature as a whole generates light (mixture) having a specific color point, which color point can be set by setting the relative intensities of the different light sources of that specific armature. The armatures can be controlled independently from each other, such that the color points of the different armatures may be mutually different.

The layout of the array of armatures will be chosen in relationship to the shape of the area to be illuminated. The array may be 1-dimensional (line-shaped array), so that the location of the individual armatures can be described by one place coordinate. The array may also be a 2-dimensional grid, so that the location of the individual armatures can be described by two place coordinates. The array may even be a 3-dimensional grid, so that the location of the individual armatures can be described by three place coordinates. The disposition of armatures in one dimension may be along straight lines, but such lines may also be curved. The mutual distance between neighboring armatures may always be the same, but this distance may vary over the area (and, to make things more complicated, may even vary as a function of time; but, as mentioned, the dependency of time will be ignored in the present explanation).

It should be clear that the actual distribution of color points of the light over the illuminated area depends on the layout of the array of armatures and the color points of the respective armatures, but also on the shape (spatial intensity distribution) of the respective light beams of the armatures. After all, most locations will receive light from more than one armature. It is very difficult and unpractical to describe the desired color distribution over the entire area. Therefore, in the following explanation, the phrase "spatial color distribution" will be used to indicate the distribution of the color points over the array of armatures. Thus, the "spatial color distribution" will be embodied by an array of color points.

For a designer who wishes to achieve a certain color effect, it will be necessary to calculate the individual color points, which is again a difficult, time-consuming and tedious effort, the more so as the number of armatures increases. Thus, the present invention aims to provide a method and device with which the process of creating spatial color distributions is made much more convenient and user-friendly.

In the case of a dynamic color sequence, the problem is basically to define a set of color points and to sequentially generate these color points; thus, the color points are generated as a function of the coordinate "time". As mentioned, this can be indicated as defining a path in color space and traveling the path. In the case of a spatial color distribution, the problem is likewise to define a set of color points (again defining a path in color space), but now the color points are generated simultaneously by corresponding armatures; thus, the color points are generated as a function of the coordinate "place". Thus, in general, the present invention aims to provide a method and device for calculating a set of color points in a convenient and user-friendly way.

SUMMARY OF THE INVENTION

According to an important aspect of the present invention, a path in the color space is defined using one or more functions. A user interface allows a designer to select two or more different colors, and calculates, in accordance with pre-defined functions, a path that connects these colors. Further, the interface calculates, in accordance with user-settable conditions, a set of discrete color points along this path. In the case of dynamic color sequences, the user is further allowed to set or vary the speed at which the path is traveled. In the case of spatial color distributions, the user is further allowed to input the number of color points along the path, in accordance with the number of armatures. Since it now suffices for the user to select a small number of colors and a small number of functional parameters in order to design an entire dynamic color sequence or spatial color distribution, the design effort of a designer is greatly facilitated.

BRIEF DESCRIPTION OF THE DRAWINGS

These and other aspects, features and advantages of the present invention will be further explained by the following description with reference to the drawings, in which same reference numerals indicate same or similar parts, and in which.

DETAILED DESCRIPTION OF THE INVENTION

Figure 1:
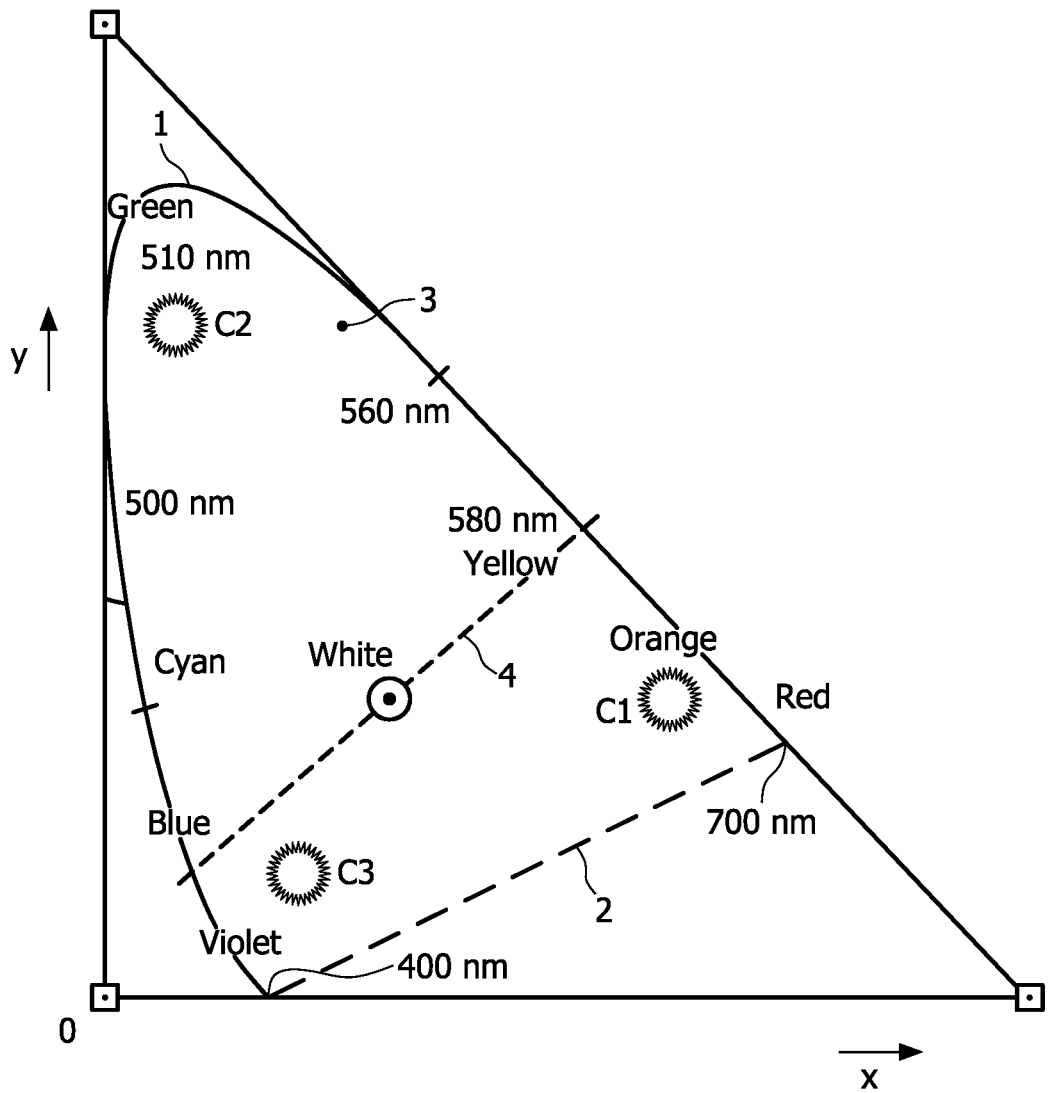
FIG. 1 schematically shows a chromaticity diagram.

FIG. 1 schematically shows a CIE(xy) chromaticity diagram. This diagram is well-known, therefore an explanation will be kept to a minimum. Points (1,0), (0,0), and (0,1) indicate ideal red, blue and green, respectively, which are virtual colors. The curved line 1 represents the pure spectral colors. Wavelengths are indicated in nanometers (nm). A dashed line 2 connects the ends of the curved line 1. The area 3 enclosed by the curved line 1 and dashed line 2 contains all visible colors; in contrast to the pure spectral colors of the curved line 1, the colors of the area 3 are mixed colors, which can be obtained by mixing two or more pure spectral colors. Conversely, each visible color can be represented by coordinates in the chromaticity diagram; a point in the chromaticity diagram will be indicated as a "color point".

It is noted that a different graphical color representation, for instance the RGB chromaticity diagram, may also be used, as should be clear to a person skilled in this art. Preferably, the colors are represented in CIELAB color space, because it is known for its quality of perceptual uniformity.

To explain color mixing, the CIE 1931 (x,y) chromaticity diagram is useful. When two pure spectral colors are mixed, the color point of the resulting mixed color is located on a line connecting the color points of the two pure colors, the exact location of the resulting color point depending on the mixing ratio (intensity ratio). For instance, when violet and red are mixed, the color point of the resulting mixed color purple is located on the dashed line 2. Two colors are called "complementary colors" if they can mix to produce white light. For instance, FIG. 1 shows a line 4 connecting blue (480 nm) and yellow (580 nm), which line crosses the white point, indicating that a correct intensity ratio of blue light and yellow light will be perceived as white light. It is noted that the light mixture actually still contains two spectral contributions at different wavelength. The same would apply for any other set of complementary colors: in the case of the corresponding correct intensity ratio, the light mixture will be perceived as white light.

If the light intensity of two complementary colors (lamps) is indicated as I1 and I2, respectively, the overall intensity Itot of the mixed light will be defined by I1+I2, while the resulting color will be defined by the ratio I1/I2. For instance, assume that the first color is blue at intensity I1 and the second color is yellow at intensity I2. If I2=0, the resulting color is pure blue, and the resulting color point is located on the curved line 1. If I2 is increased, the color point travels the line 4 towards the white point. As long as the color point is located between pure blue and white, the corresponding color is still perceived as blue-ish, but closer to the white point the resulting color would be paler.

In the following, the word "color" will be used for the actual color in the area 3, in association with the phrase "color point". The "impression" of a color will be indicated by the word "hue"; in the above example, the hue would be blue. It is noted that the hue is associated with the spectral colors of the curved line 1; for each color point, the corresponding hue can be found by projecting this color point onto the curved line 1 along a line crossing the white point.

Further, the fact whether a color is a more or less pale hue will be expressed by the phrase "saturation". If a color point is located on the curve 1, the corresponding color is a pure spectral color, also indicated as a fully saturated hue (saturation=1). As the color point travels towards the white point, the saturation decreases (less saturated hue or paler hue); in the white point, the saturation is zero, per definition.

It is noted that properties of a color, such as the values of the hue and saturation, are color space dependent, and there also exist various ways to calculate hue and saturation. Nevertheless, the present invention is applicable irrespective of the precise definition of hue and saturation.

It is noted that many visible colors can be obtained by mixing two colors, but this does not apply for all colors, as can easily be seen from FIG. 1. In order to be able to produce light having any desired color, three lamps producing three different colors are needed. More lamps may be used, but that is not necessary.

In the following, the invention will first be explained specifically for the case of dynamic color sequences.

Figure 2:
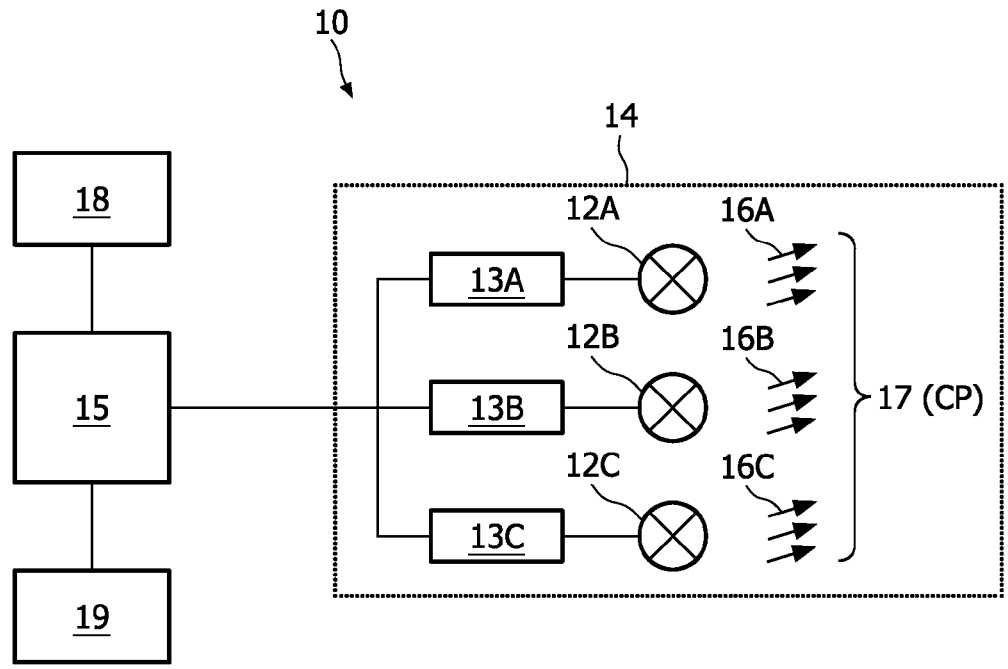
FIG. 2 schematically shows a block diagram of an illumination system for dynamic color sequences.

FIG. 2 schematically shows a block diagram of an illumination system 10, comprising a lamp assembly 14. The lamp assembly 14 comprises a plurality of (here: three) lamps 12A, 12B, 12C, each with an associated lamp driver 13A, 13B, 13C, respectively, controlled by a common controller 15. A user input device is indicated at 19. The three lamps 12A, 12B, 12C generate light 16A, 16B, 16C, respectively, with mutually different light colors; typical colors used are red (R), green (G), blue (B). Instead of pure red, green and blue, the lamps will typically emit light close-to-red, close-to-green and close-to-blue, as indicated by three exemplary color points C1, C2, C3 in FIG. 1, respectively. The overall light emitted by the lamp assembly 14 is indicated at 17; this overall light 17, which is a mixture of individual lights 16A, 16B, 16C, has a color point CP within the triangle defined by corner points C1, C2, C3.

It is noted that a lamp 12A, 12B, 12C may be implemented by a plurality of light sources, for instance LEDs, controlled in parallel and all generating the same color. It is also possible that the lamp assembly 14 comprises a plurality of groups of lamps, each group comprising a set of lamps 12A, 12B, 12C, all sets of lamps 12A, 12B, 12C being driven in the same way such as to produce identical color points.

With the system 10, it is possible to set the mixture color of the output light mixture 17 at any desired location within said triangle, if it is possible to change the light intensities of the individual lamps 12A, 12B, 12C continuously. Typically, however, the controller 15 is a digital controller, and the light intensities of the individual lamps 12A, 12B, 12C can only be changed with discrete steps. In such case, the attainable color points are located along a grid in the color space. The color points are stored in a color table in a memory 18 of the controller 15. If the controller has a sufficiently high resolution, the grid is sufficiently fine-mazed and the discrete nature of the steps from one point to a neighboring point is not visible to the human eye. As regards color representation, CIELAB color space is preferred, because the distance between two neighboring grid points corresponds to substantially equal differences in perceived color over the entire CIELAB color space.

Figure 3:
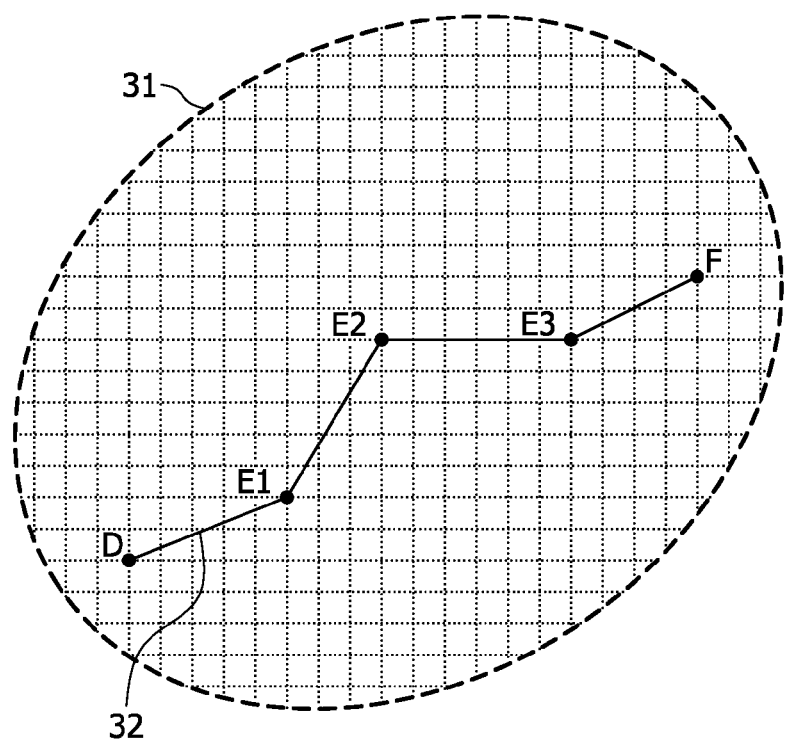
FIG. 3 schematically illustrates a path in color space.

FIG. 3 schematically shows an illustrative portion 31 of the color space, showing the grid of color points, and also showing two color points D and F. Assume that a designer wishes a smooth transition from color point D to color point F. According to the state of the art, the designer must calculate intermediate color points E1, E2, E3, etc. Then, he must program the controller 15 to step from color point D to the first intermediate color point E1, to maintain this situation for a first halt time, to step to the second intermediate color point E2, to maintain this situation for a second halt time, etc, until reaching point F. Then he must run the program and view the resulting illumination sequence. If he is not satisfied (in the example, point E2 is off course), he must make amendments and execute again.

As can be seen in FIG. 3, when the controller 15 subsequently changes the setting of the light source assembly from the starting color point D via the intermediate color points E1, E2, E3 to the end color point F, these changes can be visualized as a path 32 traveled by the controller in the color space. In the state of the art, the path 32 is the resultant of the individual color points calculated by the designer; intermediate color points which are not calculated by the designer are skipped. According to the present invention, the designer may input or select a formula describing the shape of the path, and the designer may further input some characteristic parameters of the formula, and the controller 15 will calculate color points along the path described by the formula. These features of the invention will be explained with reference to FIGS. 4A-C.

Figure 4A:
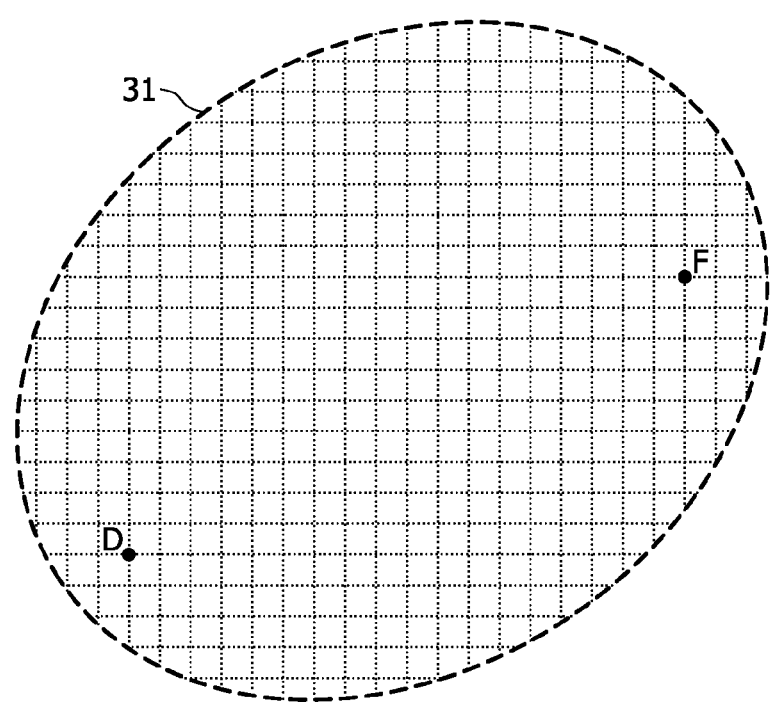
FIGS. 4A-D schematically illustrate the operation of an illumination system according to the present invention.

FIG. 4A, like FIG. 3, schematically shows an illustrative portion of the color space, showing the grid of color points, and also showing two color points D and F inputted by the designer. Since inputting color points is already known in the prior art, it is not necessary to explain how color points are identified. According to the invention, the designer does not need to input color points between these two color points D and F.

In the following, by way of illustrative example, it will be assumed that the controller 15 is equipped with a graphical user interface for allowing the user to input his selection of the path parameters, but it should be clear that other means for parameter input are conceivable as well.

Figure 4B:
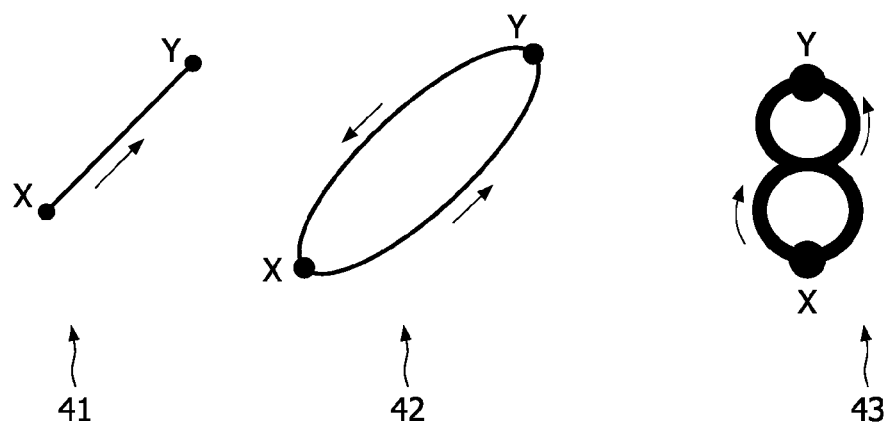

FIG. 4B is an overview of possible path shapes that may be imaged as an icon on a display screen of such graphical user interface. Selecting a path shape may be done by graphically "clicking" the icon or, in case of a touch-screen user-interface, by appropriately touching the screen. At 41, a straight line segment with end points X and Y is shown; such line segment is described by a simple linear function. If the designer selects icon 41, the controller 15 will calculate intermediate color points along a straight linear path from starting point D to end point F.

Icon 42 corresponds to an elliptical path with apexes X and Y; such elliptic path is described by an elliptic function. If the designer selects icon 42, the controller 15 will calculate intermediate color points along a semi-elliptical path from starting point D to end point F. As a further path parameter, the designer may enter the "width" or ellipticity of the path; even a circular path is possible.

Icon 43 corresponds to an eight-shaped path with apexes X and Y; if the designer selects icon 43, the controller 15 will calculate intermediate color points along an S-shaped path from starting point D to end point F. Further possible path parameters that may be inputted by the user may include the "width" of the upper half of the eight-shape, the "width" of the lower half of the eight-shape, the location of the intersection between the upper half and the lower half of the eight-shape, etc.

It should be clear that this overview is not necessarily complete: other path shapes will be possible as well.

Figure 4C:
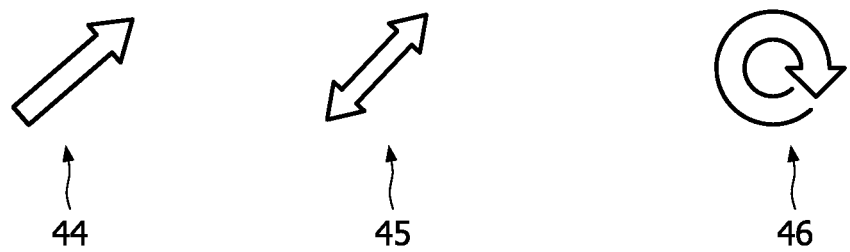

FIG. 4C is an overview of possible path repetition mode icons that may be imaged on a display screen of such graphical user interface. At 44, a single arrow is shown; if the designer selects path repetition mode 44, the controller 15 will operate in a single execution mode in which it will only calculate a sequence of intermediate color points for traveling the selected path once from starting point D to end point F. When reaching end point F, several options are possible for the user to select, represented by further icons (which are not shown for sake of simplicity). For instance, it is possible that the controller 15 will switch off the assembly 14 when reaching the end point F. It is for instance also possible that the controller 15 will maintain the color point F until receiving a further user instruction.

At 45, a double arrow is shown; if the designer selects path repetition mode 45, the controller 15 will operate in a back/forth repetition mode in which it will calculate a sequence of intermediate color points for traveling the selected path from starting point D to end point F, and then back along the same path from F to D. Then, the path from D to F and back may be repeated for a predetermined number of runs, which number of runs may also be inputted by the user. When reaching starting point D after having completed the last run, several options are possible for the user to select, represented by further icons (which are not shown for sake of simplicity). For instance, it is possible that the controller 15 will switch off the assembly 14 when reaching the starting point D. It is for instance also possible that the controller 15 will maintain the color point D until receiving a further user instruction.

At 46, a circular arrow is shown; if the designer selects path repetition mode 46, the controller 15 will operate in a continuous repetition mode in which it will calculate a sequence of intermediate color points for traveling the selected path from starting point D to end point F, and then repeat the same path from D to F. Thus, in the case of open-ended paths such as the path represented by icon 41, the color setting will jump from color point F to color point D. In the case of closed loop paths such as the path represented by icons 42 or 43, the continuation will include traveling back from end point F to starting point D along the second half of the loop, i.e. an opposite semi-elliptical path in the case of icon 42, or a mirrored S-shaped path in the case of icon 43. Then, the closed-loop path from D to F to D may be repeated for a predetermined number of runs, which number of runs may also be inputted by the user. When reaching starting point D after having completed the last run, several options are possible for the user to select, represented by further icons (which are not shown for sake of simplicity). For instance, it is possible that the controller 15 will switch off the assembly 14 when reaching the starting point D. It is for instance also possible that the controller 15 will maintain the color point D until receiving a further user instruction.

It should be clear that this overview is not necessarily complete: other repetition modes will be possible as well.

Figure 4D:
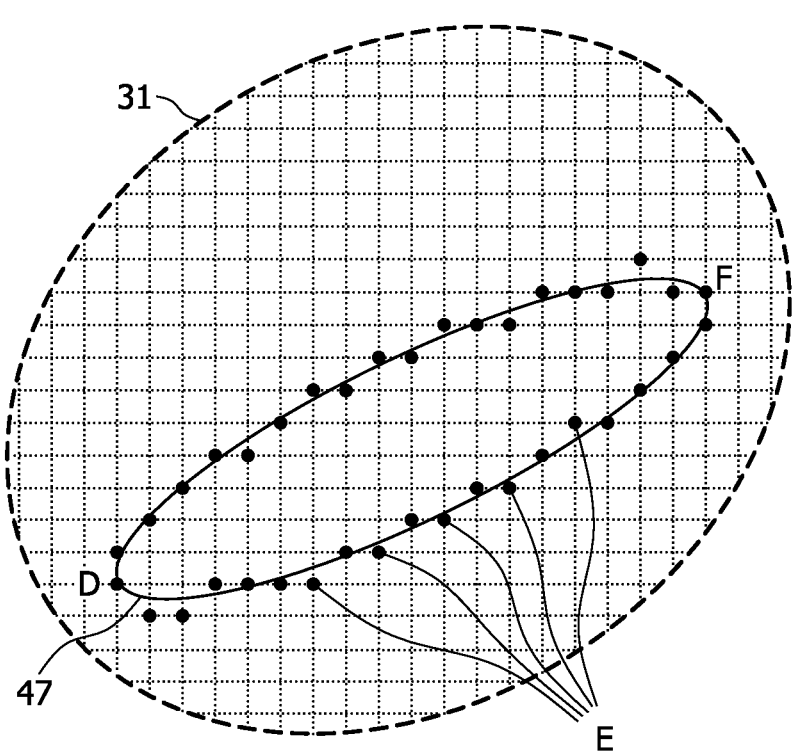

Assume that, for the starting and end points D and F in FIG. 4A, the designer has selected elliptical path 42 and single arrow repetition mode 44. The controller 15 may then calculate intermediate color points E as shown in FIG. 4D, approximating the selected color path 47. It is noted that, if it is required to minimize memory space, the spacing of the grid in color space may be relatively wide, in which case the controller may be designed to calculate color points between the points of the color table by using interpolation; since different methods for interpolation are known per se, it is not necessary to explain such interpolation methods here.

The above explanation has illustrated that, in response to receiving a few relatively simple parameters, the controller 15 will calculate color points in the color space. However, apart from the path 47 to be followed in the color space, the ultimate effect of the illumination sequence may have more variables. Examples of such variables are mentioned below.

A first example of such variable is the brightness. It is possible that the brightness of the mixed color 17 is kept constant in time. However, it is also possible that the brightness of the mixed color 17 changes along the path 47 or as a function of time. The controller 15 is preferably designed to allow the designer to select a function and input function parameters that describe the changes of the brightness, either as a function of time or as a function of the position along the path 47 to be traveled.

A second example of such variable is what will be termed as the "color speed", i.e. the amount of color change as a function time. As will be clear to persons skilled in the art, in the CIELAB color space this color speed is indicated as $\Delta E/s$, and it can be visualized as the speed with which the set color point travels the path 47. In case an other definition for color difference is used in stead of $\Delta E$, like for instance $\Delta E_{94}$, $\Delta E_{2000}$, etc, the color speed will accordingly be indicated, for instance as $\Delta E_{94}/s$, $\Delta E_{2000}/s$, respectively. It is possible that the color speed is kept constant in time. However, it is also possible that the color speed changes along the path 47 or as a function of time. The controller 15 is preferably designed to allow the designer to select a function and input function parameters that describe the color speed, either as a function of time or as a function of the position along the path 47 to be traveled. It should be clear to a person skilled in the art that the color speed corresponds to the duration of the time a color point is maintained before a change is made to the next color point. This time will be indicated as the "residence" time: the system "resides" in this setting for some time. When the color speed increases, the residence time decreases. The residence time can be effected in two ways. It is possible that the residence time is sent to the drivers 13 as a control parameter, together with the corresponding intensity setting, in which case the drivers are designed to receive the control signals, store them in a buffer memory, and read them from the buffer memory together with the corresponding residence time. It is also possible that the controller 15 sends the control signals of a certain color point, waits for the duration of the residence time, and then sends the control signals of a next color point, in which case the drivers are designed to immediately respond to the control signals.

Using the functions and function parameters selected and/or inputted by the designer, the controller generates a dynamic sequence of control signals for the lamp drivers 13A, 13B, 13C, having the result that the mixed light 17 has a color point that travels through the color space along a defined path 47 with a defined speed, either once (44) or repeatedly (45; 46), while the brightness also obeys a user-defined function. If the designer is not satisfied with the result, he can easily amend one or more parameters, whereupon the controller calculates adapted color points, brightness and color speed.

In the following, the invention will now be explained specifically for the case of spatial color distribution.

Figure 5:
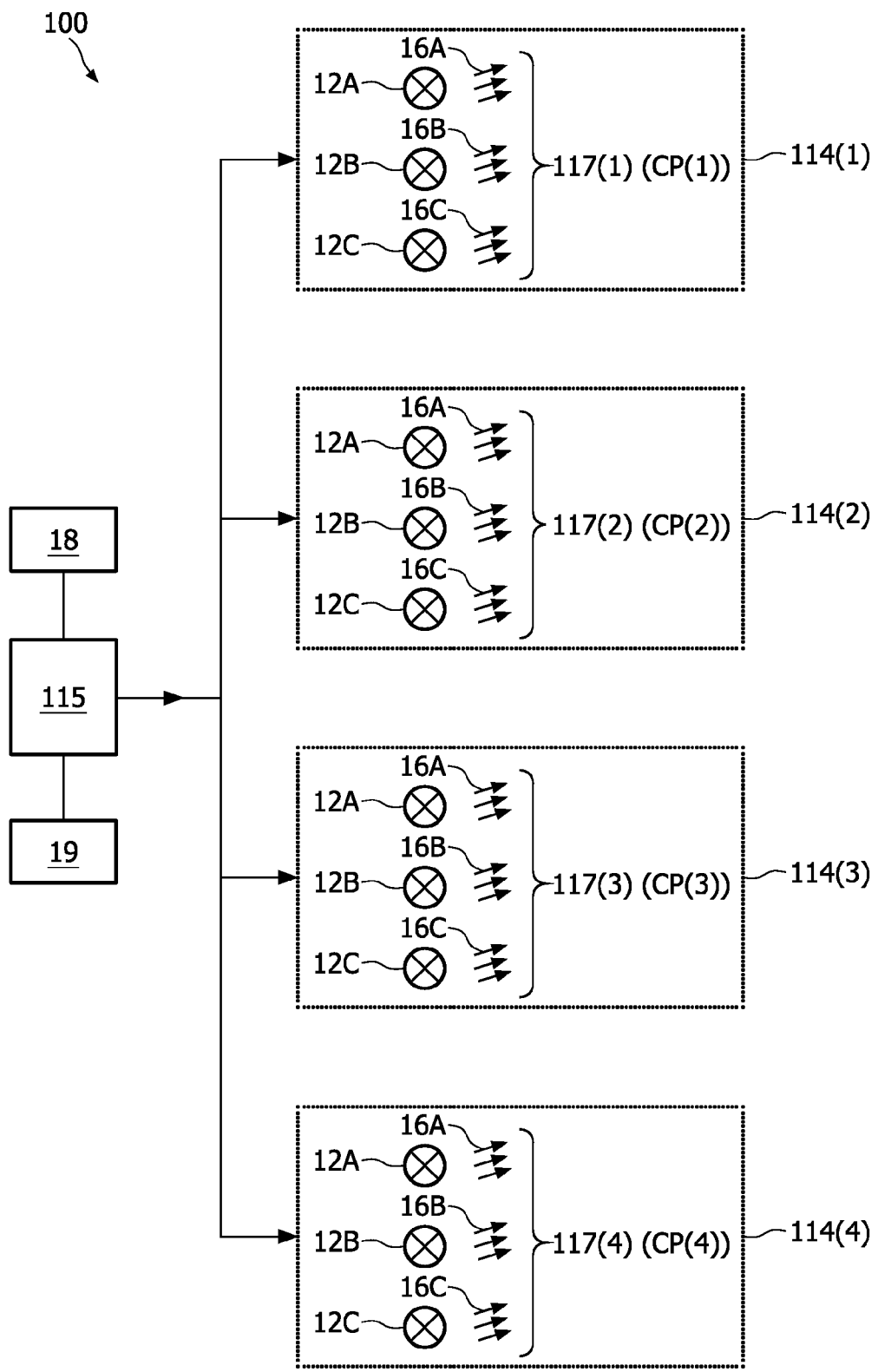
FIG. 5 schematically shows a block diagram of an illumination system for spatial color distribution.

Comparable to FIG. 2, FIG. 5 schematically shows a block diagram of an illumination system 100, comprising a plurality of lamp assemblies 114; in order to mutually distinguish the lamp assemblies, the reference number 114 is supplemented by a number between brackets. In the example of FIG. 5, four lamp assemblies are shown, but an illumination system may comprise three or less or five or more assemblies. The lamp assemblies 114 may be mutually identical, and for each lamp assembly 114 the description of the lamp assembly 14 of FIG. 2 applies, which will therefore only be repeated briefly. Each lamp assembly 114 comprises a plurality of lamps 12A, 12B, 12C, each with an associated lamp driver (not shown). For each lamp 12A, 12B, 12C, the description given above for the lamps 12A, 12B, 12C of system 10 applies. The mixed light output of a lamp assembly 114(i) is indicated at 117(i); this light 117(i) has a color point CP(i).

The lamp assemblies 114 are arranged in a spatial relationship with respect to each other, to illuminate an area. For sake of explanation, it may be assumed that the lamp assemblies 114 are arranged along a line, so the index (i) of each assembly 114(i) can be considered to indicate a position coordinate.

The lamp assemblies 114 are controlled by a common controller 115. The common controller 115 is capable of driving all lamp assemblies 114 such that the corresponding color points CP have certain desired values, on the basis of input received from the input device 19 and the information in the memory 18. Thus, in the area to be illuminated, a spatial distribution is effected of color point CP(i) as a function of place.

It is of course possible that the color points CP(i) are chosen at random. However, a more practical situation is that a designer wishes the color points CP(i) to obey certain rules, i.e. that they are located along a certain path in the color space (compare color path 32 in FIG. 3). Referring to FIG. 3, assume that a designer wishes the assemblies 114 to effect a smooth distribution from color point D to color point F, wherein color points D and F are target values for the color points CP(1) and CP(4) of the outer assemblies 114(1) and 114(4). According to the state of the art, the designer must calculate intermediate color points E1, E2, E3, etc. for the intermediate assemblies 114(2), 114(3), etc. Then, he must program the controller 115 to generate its control signals for the respective assemblies 114 such as to have each assembly 114 generate light with the calculated color point. Then he must run the program and view the resulting color distribution. If he is not satisfied (in the example, point E2 is off course), he must make amendments and execute again.

In the state of the art, the designer must calculate all color points along a path 32. According to the present invention, the designer may input or select a formula describing the shape of the path, and the designer may further input some characteristic parameters of the formula, and the controller 115 will calculate color points along the path described by the formula. For explaining these features of the invention, reference can be made again to FIGS. 4A-B.

According to the invention, the designer may input two color points D and F for the outer lamp assemblies 114(1) and 114(4), respectively; the designer does not need to input color points between these two color points D and F, to be used for the intermediate lamp assemblies 114(2) and 114(3).

Assume that the designer uses the graphical user interface explained in the above. If the designer selects icon 41, the controller 115 will calculate intermediate color points along a straight linear path from starting point D to end point F. If the designer selects icon 42, the controller 115 will calculate intermediate color points along a semi-elliptical path from starting point D to end point F. If the designer selects icon 43, the controller 115 will calculate intermediate color points along an S-shaped path from starting point D to end point F.

Assume that, for the starting and end points D and F in FIG. 4A, the designer has selected elliptical path 42. The controller 115 may then calculate intermediate color points CP(2) and CP(3) as shown in FIG. 6, approximating the selected color path 47.

It is noted that, in the present example, the system 100 comprises only four assemblies 114, so the number of color points on the path 47 is equal to four, including the starting point D and end point F. In case the number of assemblies increases, the number of color points likewise increases.

Figure 6:
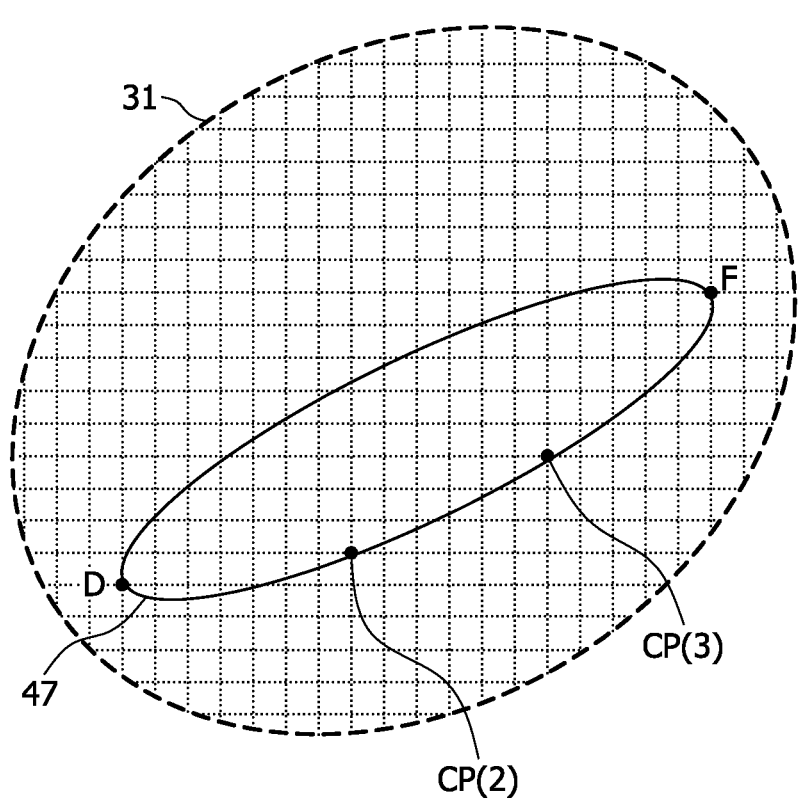
FIG. 6 schematically illustrates the setting of color points in a spatial color distribution.

It is further noted that FIG. 6 illustrates mutually identical distances between neighboring color points on the color path 47, but this is not essential. In case the mutual distances between neighboring assemblies 114 are known, the respective distances between neighboring color points may be taken to have the same ratios. Or, it is possible that the system allows the user to input absolute or relative values for the distances between neighboring color points.

In the above example, the system 100 only comprises assemblies 114 arranged according to one spatial coordinate. It is however also possible that the system 100 comprises assemblies 114 arranged in a two-dimensional array of rows and columns. In such case, the assemblies can be indicated by reference 114(i,j), and the corresponding color points can be indicated by reference CP(i,j), wherein the indices i and j indicate the location in i-th row and j-th column. The above explanation then applies to one single row (or column). For the other rows (or columns), the user may repeat his actions per row (or column). However, the input device 19 may have specific input commands (icons) allowing the user to instruct the controller 115 to derive the color path of other rows (or columns) from the color path defined by the user.

In an exemplary embodiment, with m rows and n columns, the designer defines the color points CP(1,1), CP(1,n), CP(m,1) and CP(m,n) for the corner assemblies 114(1,1), 114(1,n), 114(m,1) and 114(m,n), respectively. Using the above-explained method, the designer defines a first color path for the side assemblies 114(1,1) to 114(1,n), a second color path for the side assemblies 114(m,1) to 114(m,n), and a third color path for the side assemblies 114(1,1) to 114(m,1). The controller 115 calculates color points CP(1,1) to CP(1,n) along the first color path, and calculates color points CP(m,1) to CP(m,n) along the second color path. For each column j, the controller 115 calculates a color path for the 114(1,j) to 114(m,j), using the color points CP(1,j) on the first color path and CP(m,j) on the second color path as values for the outer assemblies 114(1,j) and 114(m,j), respectively, and using the shape of the third color path.

The above explanation has illustrated that, in response to receiving a few relatively simple parameters, the controller 15 will calculate a set of color points in the color space for setting an array of lamp assemblies for obtaining a spatial color distribution.

It should be clear to a person skilled in the art that the present invention is not limited to the exemplary embodiments discussed above, but that several variations and modifications are possible within the protective scope of the invention as defined in the appending claims.

For instance, in the above example it is assumed that the designer enters two reference color points D and F. However, it is also possible that the designer enters only one reference color point. A path may be defined by only one user-inputted color point, when a fixed color point (for instance a white point) is used as a second reference point. For instance, a circular path around the white point can be defined with only one user-inputted color point.

Further, in the above example both user-inputted color points are intersected by the controller-calculated path 47. However, it is also possible that one of the user-inputted color points is used as a reference point for the controller-calculated path 47 without being intersected by that path: for instance, the center of a circle, or the focal point of an ellipse or parabolic path.

Further, it is also possible that the designer enters three or more reference color points, and that the controller calculates a path intersecting all those points. By way of example, it is possible that a path is calculated from white to a first user-inputted color point and back (either via a straight line of constant hue (41) or via a loop (42 or 43), then from white to a second user-inputted color point and back, and so forth.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

Further, in the above explanation, the functional blocks "User Interface" 19, "controller" 15, "driver" 13, "lamp" 12 are shown as separate devices. However, in a practical implementation two or more functions may be integrated in a common device. For instance, the functions of user interface 19 and controller 15 may be performed by one single device. Or, for instance, the functions of controller 15 and driver 13 may be performed by one single device.

Further, it is noted that the color space for each color mixing luminaire has a certain boundary, due to the physical limitations of the system. In case the created color path has a certain part that is located outside this color space boundary, the software for creating the dynamical effect is preferably designed to take counter measures to avoid the creation of meaningless lamp control signals. Different approaches are possible to solve this issue. The most attractive solution is to replace any calculated color point which is located outside the color space by the nearest color point located on the color space boundary.

Although the preferred embodiment of this invention is based on the CIELAB color space, the methods described are not limited to this color space only. Other color spaces, with good perceptual uniformity (e.g. u'V'Y color space), are also possible, in combination with a certain luminance-luminance difference definition.

To obtain an intuitive method, it is most attractive to describe color points in terms of three coordinates Hue, Saturation, and Brightness, and to define color paths as sequences of (Hue, Saturation, Brightness). The use of a perceptual uniform color space with appropriate luminance-luminance difference ensures that discrete steps can be made through the color space with smooth color transitions. This is of great relevance in for example applications where the dynamic lighting effect must be in "harmony" or "ambient" with its surroundings, e.g. restaurants, shops, hotels.

The invention claimed is:

1. An illumination system for generating light, comprising:
    at least one lamp assembly configured to generate light having a variable color;
    a controller for controlling the lamp assembly;
    a user input device coupled to the controller; the controller being configured, to generate color control signals for the lamp assembly based at least in part of data received from the user input device; wherein the controller is configured:
    to calculate a path in a color space,
    to calculate the coordinates of a set of color points along the path, and
    to generate the color control signals based on the set of color points, wherein the data received from the user input device relate to a formula describing the color speed as a function of time or as a function of the position along the path, and wherein the controller is configured to calculate its color control signals in conformity with said formula.

2. The illumination system according to claim 1, wherein for each color point the controller is configured to calculate an associated residence time, and wherein the controller is configured to generate control signals relating to a specific color point, wait until the corresponding residence time has passed, and then generate subsequent control signals relating to a subsequent color point.

3. The illumination system according to claim 1, wherein, for each color point, the controller is configured to calculate an associated residence time; wherein the controller is configured to generate control signals relating to a specific color point, to generate data signals relating to the corresponding residence time of that specific color point, to send both the control signals and the data signals to the lamp assembly; wherein the lamp assembly is configured to receive the control signals and the data signals, to adapt the setting of the color point of the output light in conformity with the control signals received, to maintain this setting for a time period in conformity with the data signals received, and then to adapt the setting of the color point of the output light in conformity with subsequent control signals received.

* * * * *